United States Patent

Fortune et al.

[11] Patent Number: 6,016,102
[45] Date of Patent: Jan. 18, 2000

[54] PRESSURE SENSOR HOUSING

[75] Inventors: G. Clark Fortune, Farmington Hills; Thomas J. Waraksa, Clarkston; James K. Spring, Brighton; John D. Prainito, Rochester Hills, all of Mich.

[73] Assignee: Eaton Corporation, Cleveland, Ohio

[21] Appl. No.: 09/240,756

[22] Filed: Jan. 29, 1999

[51] Int. Cl.[7] .................................................. B60C 23/00
[52] U.S. Cl. ..................... 340/442; 340/58; 200/61.25; 200/61.26; 73/146.3; 73/146.5; 73/754; 73/755; 73/861.52; 152/752.1
[58] Field of Search .................. 340/442, 58; 200/61.25, 200/61.26; 73/146.3, 146.5, 754, 755, 861.52; 152/152.1

[56] References Cited

U.S. PATENT DOCUMENTS

| | | | |
|---|---|---|---|
| 4,048,614 | 9/1977 | Shumway | 340/58 |
| 4,090,172 | 5/1978 | Vesnic | 340/58 |
| 4,701,742 | 10/1987 | Ruehr | 340/58 |
| 4,737,760 | 4/1988 | Huang et al. | 340/58 |
| 4,793,277 | 12/1988 | Haas et al. | 116/34 R |
| 4,890,090 | 12/1989 | Ballyns | 340/442 |
| 4,954,677 | 9/1990 | Alberter et al. | 200/834 |
| 4,975,679 | 12/1990 | Ballyns | 340/442 |
| 5,055,826 | 10/1991 | Ballyns | 340/442 |
| 5,119,066 | 6/1992 | Ballyns | 340/442 |
| 5,297,424 | 3/1994 | Sackett | 73/146.5 |
| 5,573,611 | 11/1996 | Koch et al. | 152/152.1 |

*Primary Examiner*—Jeffery A. Hofsass
*Assistant Examiner*—Tai Tan Nguyen
*Attorney, Agent, or Firm*—Daniel S. Kalka; Roger A. Johnston

[57] ABSTRACT

An apparatus (10) allows atmospheric pressure into an environmentally sealed enclosure for creating an equilibrium that allows a sensor (28) make a proper measurement. A slot or opening (26) in the cover (14) exposes outside atmospheric air to a restricted portion of a gas permeable membrane (18). The membrane (18) allows a selected gas to pass through the membrane (18) creating the equilibrium in the housing (12). A gasket (16) positioned between the cover (14) and housing (12) seals the housing in an air tight manner except for the gases allowed in through the membrane (18). Pressure sensor (28) can then make a more accurate measurement. Apparatus (10) finds particular utility in a low pressure tire management system.

20 Claims, 3 Drawing Sheets

PRESSURE SENSOR HOUSING

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

The present invention relates in general to a pressure sensor housing, and more particularly to an apparatus that allows a pressure sensor in a sealed enclosure measure atmospheric pressure in a hostile environment. The present invention further relates to a pressure sensor system particularly suited for use in a tire pressure management system for generating a signal when a change in pressure in the tire exceeds or falls below a predetermined set point.

2. Description of the Related Art

There is a large percentage of vehicles being operated today with at least one tire underinflated or even overinflated. While some types of tires are somewhat tolerant to low pressure, the load capacity and life of any tire is related to inflation pressure. Heat generated within a tire from flexure can cause premature wear and in some cases sudden failure which may cause accidents or be catastrophic. While some tire companies have responded to this situation with "run-flat" or self-sealing tires, the loss of pressure within a tire still is somewhat undetectable and eventually if unnoticed the tire may fail. Thus, it is desirable to utilize tire pressure management systems. Tire pressure sensing on vehicles has several potential benefits, like safety and economy.

There are various types of pressure sensors known in the art, including tire pressure sensor systems.

U.S. Pat. No. 4,701,742, issued to Ruehr, describes a pneumatically operated pressure switch for monitoring the air pressure in a tire. The housing capsule of the pressure switch is designed so as to be mounted in a conventional rim of a motor vehicle wheel, or even mounted inside the wheel rim.

U.S. Pat. No. 4,793,277, issued to Haas, et al., also relates to a tire pressure detector for a motor vehicle which is designed to be fastened to a wheel rim.

U.S. Pat. No. 4,954,677, issued to Alberter, et al., describes a tire pressure sensor that is constructed to be fastened to a rim of a vehicle wheel and employs a referenced pressure chamber filled with a gas.

U.S. Pat. Nos. 4,890,090; 4,975,679; 5,055,826; and 5,119,066, all issued to Ballyns, relate to various pressure sensor systems for tires.

Gas permeable membranes have been known in the art, primarily to allow pressure equalization in vehicular electronics closures. This method of pressure equalization reduces the amount of ambient moisture condensation that is pumped into the enclosure. Manufacturers supply membrane materials like GORE-TEX® to electronic assembly producers such as Bosch, United Technologies, Seimens, and Caterpillar, among others. It is believed that Caterpillar has used a breather membrane to allow atmospheric pressure into the interior of their 3406 PEEC engine control to effect altitude compensation for their fueling algorithms.

There still exists a need for a tire pressure management system that allows atmospheric pressure to penetrate an environmentally sealed enclosure or housing to create an equilibrium which would allow a pressure sensor to achieve a proper reading even in a hostile environment and to make any necessary adjustments in pressure readings.

BRIEF SUMMARY OF THE INVENTION

The present invention is directed to solving the aforementioned problems with the prior art as well as others by providing an apparatus that allows atmospheric pressure to penetrate an environmentally sealed enclosure for creating an equilibrium which allows a sensor contained therein to achieve a pressure reading of atmospheric pressure for use in a tire pressure management system.

The apparatus of the present invention includes a housing having a plurality of compartments with one open end. A cover is positioned on the housing and is constructed to provide a sealing fit therewith. A gasket interposed between the cover and the housing provides a fluid-tight seal between the cover and the housing. The gasket includes at least one passage of a predetermined size to allow passage of gas between the cover and the housing. A gas permeable membrane is also interposed between the cover and the housing. Preferably, the gas permeable membrane is positioned above the gasket. The gas permeable membrane is constructed of a material that allows a gas like air, to pass therethrough. A pressure sensor positioned within the housing measures atmospheric pressure provided by the air pressure that equalizes through the gas permeable membrane and the passage in the gasket. This allows the pressure sensor to make a proper measurement or reading of atmospheric pressure once equilibrium is achieved within the housing. The atmospheric pressure is then employed to compensate the individual tire pressure sensor readings for an accurate measurement of tire pressure.

Accordingly, one object of the present invention is directed to providing an apparatus that allows a sensor in a sealed enclosure receive air for measuring atmospheric pressure.

Another object of the present invention is directed to providing an apparatus for use with tire pressure sensors that allows a tire pressure management system to adjust individual tire pressure readings with an atmospheric pressure reading for making a proper measurement.

Still another object of the present invention is to provide an apparatus that is suitable as a low-pressure tire management system.

Still a further object of the present invention is directed to an apparatus that allows a pressure sensor in a sealed enclosure to more accurately measure pressure by receiving atmospheric pressure in the sealed enclosure that is simple in design, rugged in construction, and economical to manufacture.

The various features of novelty which characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

DETAILED DESCRIPTION OF THE INVENTION

Figure 1:
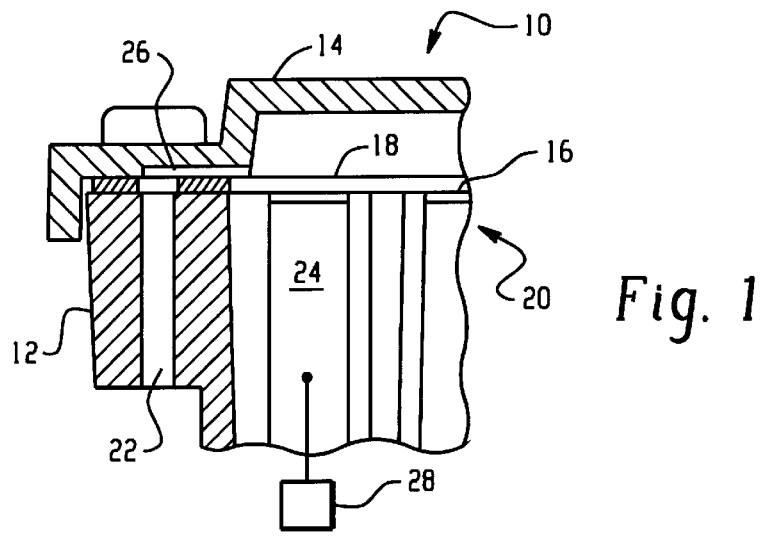
FIG. 1 is a partial sectional view of one embodiment of the apparatus of the present invention.

Referring to the drawings, where like numerals designate like or similar features throughout the several views, and first to FIG. 1, there is shown an apparatus generally designated 10 in accordance with the present invention. Apparatus 10 allows atmospheric pressure to penetrate an environmentally sealed enclosure creating an equilibrium which allows a sensor to achieve a proper reading. The apparatus 10 includes a housing 12, a cover 14, a gasket 16 interposed between the cover 14 and the housing 12, and a gas permeable membrane 18 also interposed between the cover 14 and the housing 12. Preferably, the gas permeable membrane 18 is positioned above the gasket 16.

Housing 12 is preferably constructed in a box-like shape and may include a plurality of compartments with one open end 20. Of course, housing 12 may be constructed in any shape, e.g., cylindrical or the like.

Gasket 16 is constructed of a material like a cellular urethane elastomer such as PORON® material, a federally registered trademark of Rogers Corporation, that provides a gas tight seal between cover 14 and housing 12. This material provides an environmentally sealed enclosure therein. Gasket 16 has at least one passage 22 of a predetermined size that allows passage of a gas like atmospheric air to pass from outside the housing 12 through passage 24. The passage 24 in housing 12 may be of a selected size and dimension. Passage 24 has an opening that is in communication with passage 22 and preferably in registry or substantial alignment with passage 22. The gas permeable membrane 18 allows gases to flow through passage 22, membrane 18, and opening 26 into the interior of the housing 12 to passage 24, yet maintain the clean environment therein. Membrane 18 is preferably made from GORE-TEX® material, a federally registered trademark of W. L. Gore & Associates, Inc.

The cover 14 includes the opening 26 preferably in fluid communication with passages 22 and 24. A limited portion of atmospheric gas is allowed to enter the apparatus 10 of the present invention through opening 26 in cover 14 and to pass through the gas permeable membrane 18 through passage 22 of gasket 16 into the passage 24.

The interior of the housing is in fluid communication with a pressure sensor 28 situated within housing 12. Pressure sensor 28 is preferably an atmospheric pressure sensor, but may be of any suitable design or construction. Pressure sensor 28 is advantageously enclosed within housing 12 and may include a reference pressure chamber filled with a calibrated gas at a desired pressure. Pressure sensor 28 has a chamber in fluid communication with the passage 24. This allows an equilibrium which allows the pressure sensor 28 achieve a proper reading.

Figure 2:
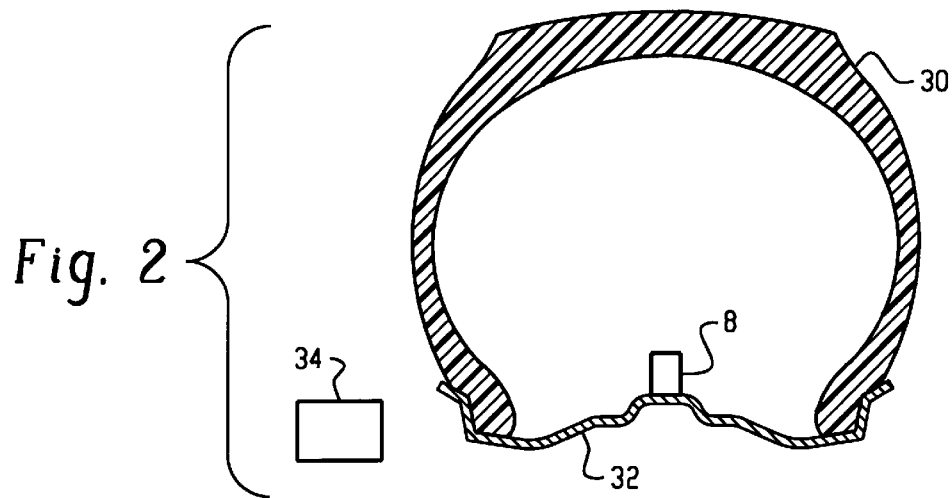
FIG. 2 is a sectional view of a vehicle tire showing a tire pressure sensor therein.

Turning next to FIG. 2, the apparatus 10 in accordance with the present invention is intended to communicate with a plurality of tire pressure sensors 8 inside tires 30. Tire 30 is situated on a rim 32 and inflated to a set pressure, such as 28–35 psi for an automobile tire or 40–100 psi for a truck tire. A tire pressure sensor 8 is preferably fastened substantially centrally inside tire 30 on rim 32 with a suitable fastener.

Figure 3:
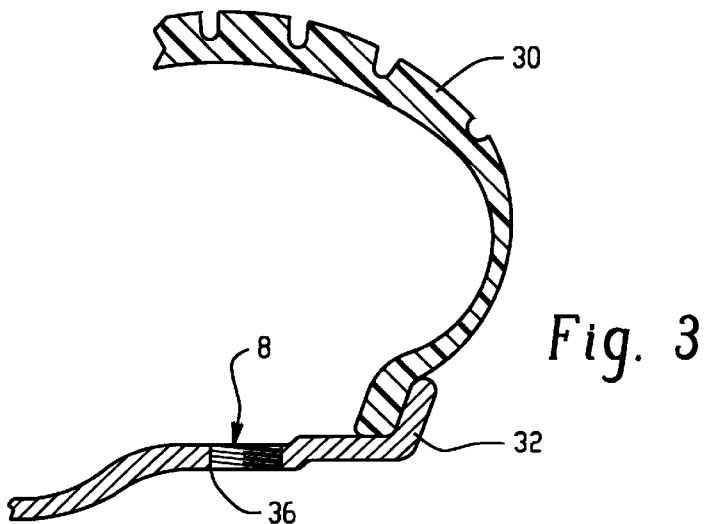
FIG. 3 is a partial sectional view of a vehicle tire illustrating an alternate location for a tire pressure sensor.

In an alternate embodiment seen in FIG. 3, the tire pressure sensor 8 may be mounted directly within a portion of the rim 32. In this arrangement, the tire sensor 8 is positioned inside rim 32 through a suitable opening or aperture 36, and may be (as shown in FIG. 3) threaded into that opening. Of course, any suitable means for fastening tire sensor 8 within the aperture 36 in rim 32 may be employed as long as it provides a substantially gas tight seal.

Apparatus 10 is in communication with all of the tire pressure sensors contained within tires 30 of a vehicle, or a selected group of tires 30, e.g., the rear axle(s). This communication is by wireless means, the preferred embodiment being radio frequency transmissions. Apparatus 10 is also in communication with an indicator or warning device 34 which is preferably situated within the cab of the vehicle to which the tire is mounted, but indicator 34 may be remotely located from the vehicle. A plurality of indicators 34 may be used for alerting an operator of the vehicle and a dispatcher or maintenance personnel at the remote location. Indicator 34 communicates with apparatus 10, for example, via shortwave, wire communication or radio frequency or any suitable wireless means. Apparatus 10 may contain batteries, such as long-life batteries, or even be self-powered, for example, a piezoelectric power source or the like, or be connected to the vehicles' electrical system.

Indicator 34 includes a visual display such as incandescent lights or light emitting diodes (LEDs) located within the cab of the vehicle, or an audio signal to the operator. Of course, indicator 34 can provide a combination of both a visual signal and an audio signal when the pressure within tire 30 either exceeds or falls below a certain limit.

The apparatus 10 receives the tire pressure inputs from the sensors 8 and monitors atmospheric pressure with any type of pressure sensor, such as a flexible diaphragm-type pressure sensor or an alternate pressure transducer system. Apparatus 10 then computes a compensated pressure signal for indicator 34. In this way, an accurate tire pressure reading is provided at high or low level elevations. Apparatus 10 is preferably mounted outside the tires to the underside or frame, or even an axle of the vehicle. Apparatus 10 is preferably centrally located and can be exposed to the wet, dirty environment associated with vehicles. In this manner, apparatus 10 compensates tire sensor measurement fluctuations that may be due to atmospheric pressure.

While the present invention is particularly suited as a housing for a tire pressure compensating atmospheric sensor in a low-pressure tire management system, it should be immediately apparent that the apparatus of the present invention is equally suited to any application where it is desired to allow atmospheric pressure in an environmentally sealed enclosure to create an equilibrium for allowing a sensor to achieve a proper or more accurate reading, for example, in marine or aerospace applications, or at elevated locations in general.

Figure 4:
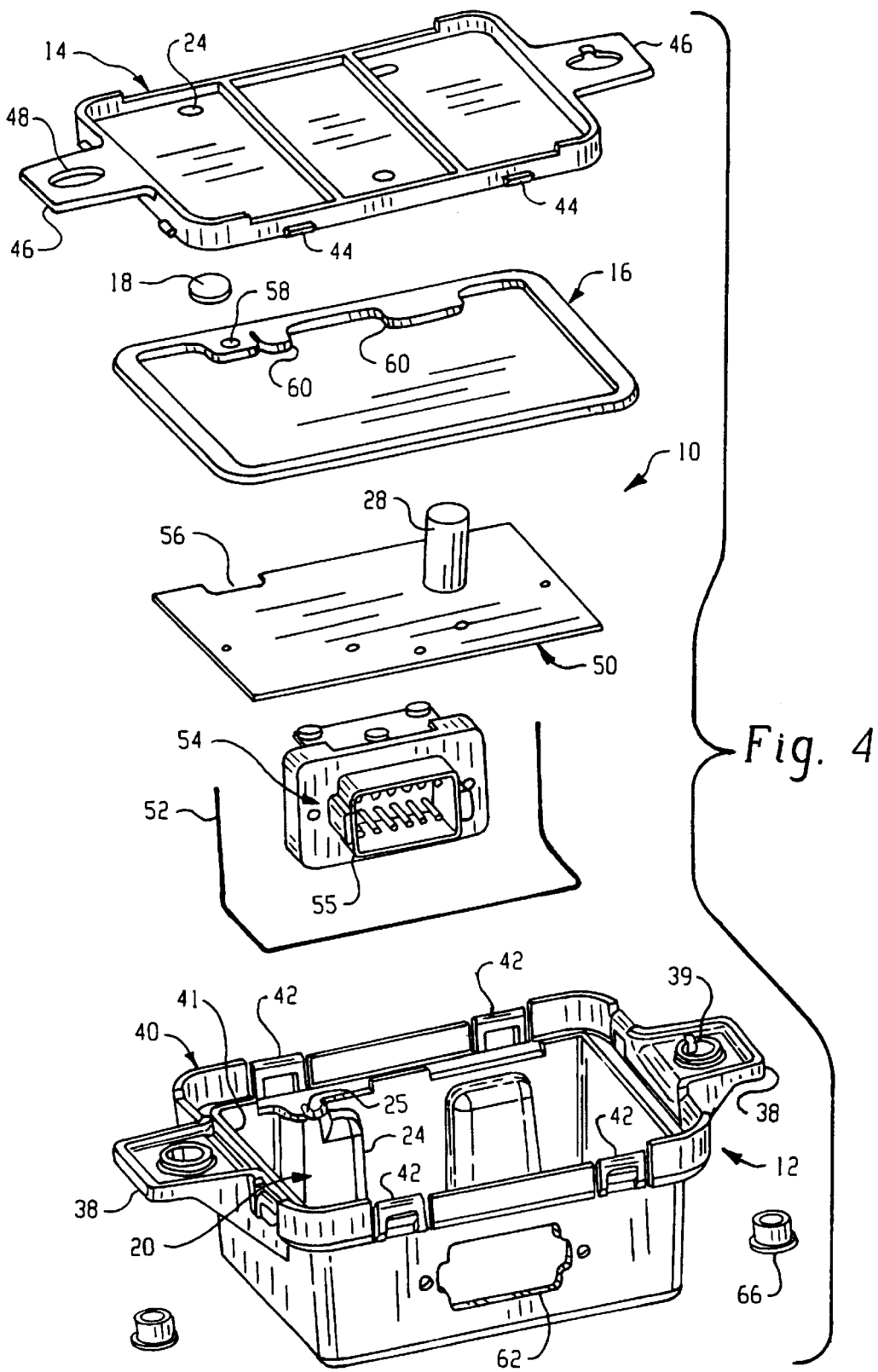
FIG. 4 is an exploded view of another embodiment of the present invention.

Referring now to FIG. 4, there is shown another embodiment of apparatus or system 10 in an exploded view. The housing 12 is constructed of a thermoplastic material like Minlon 12T, a mineral filled nylon material which is commercially available from DuPont Corporation. The housing 12 is basically a container with a floor or bottom and four walls. At least one side wall, preferably two, have extending portions 38 with openings 39 therethrough. Extending portions 38 function as mounting brackets after apparatus 10 is assembled. The open end 20 of housing 12 preferably includes an enlarged peripheral portion 40 with walls that are extensions of the walls of housing 12. Enlarged peripheral portion 40 bounds the open end 20 and is constructed to receive and engage the cover 14 preferably with a plurality of snap locking tabs 42 spacedly arranged around the periphery. Cover 14 includes mating lugs 44 to facilitate engagement, and lock cover 14 in position in the open end 20 of housing 12. Cover 14 fits within the enlarged peripheral portion 40. Preferably, enlarged peripheral portion 40 includes an inner wall 41 which is slightly smaller in height. Gasket 16 is positioned inside the peripheral portion 40 and is held in place by the walls of the peripheral portion with wall 41 holding the inside edge of the gasket.

Cover 14 preferably includes matching extending portions 46 with an opening 48 therethrough. Openings 48 are placed so as to be in alignment with the openings 39 in the housing extending portions 38 when cover 14 is positioned on housing 12.

Cover 14 further includes a first passage 24. Passage 24 is substantially aligned with the opening 58 in the gasket 16, which is also substantially aligned with passage 25. The gasket 16 is substantially rectangular and of a size adapted to fit within the enlarged peripheral portion 40. The inner wall 41 of the peripheral portion 40 secures the gasket 16 during assembly and keeps it in place. The gasket 16 is preferably made of PORON® cellular urethane material which is commercially available from Rogers Corporation.

The gas permeable membrane 18 is preferably interposed between an opening 58 in gasket 16 and cover 14. Gasket 16 is constructed with any necessary projecting portions 60 to fairly effectively seal housing 12 environmentally after the cover 14 is positioned within the enlarged peripheral portion 40.

The pressure sensor 28 is positioned within the interior of housing 12. The pressure sensor 28 is mounted and soldered to a printed circuit board 50. Thus, the outside atmospheric pressure is equalized to the interior pressure through passage 24, in cover 14, through membrane 18, through passage 58, in gasket 16, through passage 25 in housing 12, into the interior cavity of housing 12, where atmospheric pressure sensor 28 can effectively sense the pressure.

The printed circuit board 50 is constructed to be placed in housing 12 and firmly held therein for containing an antenna 52 and electrical connector 54. The printed circuit board 50 includes openings therein for fastening connector 54 thereto and for receiving the ends of antenna 52 and fixedly holding it therein. A suitable circuit is described in U.S. Pat. No. 5,297,424.

The printed circuit board 50 includes a cut-out portion 56 that allows clearance from the housing during assembly. Connector 54 is electrically connected to pressure sensor 28 and further is in communication with the tire pressure sensors 8 and indicator 34. Printed circuit board 50 includes electrical circuit means for receiving a plurality of pressure measurements from each tire pressure sensor 8 and calculating a compensated measurement for each sensor based upon an atmospheric pressure measured at or near the same time. Apparatus 10 functions as the tire pressure management receiver that further relays the corrected information to indicator 34. Preferably, connector 54 is a twelve pin connector constructed for electrical interface with mating connectors from indicator 34. The various outputs from apparatus 10 include without limitation warning lamp output, solenoid outputs and programming input.

One of the side walls of housing 12 preferably includes an opening 62 with a size designed to receive a projecting portion 55 of the electrical connector 54. This allows that portion 55 of the electrical connector to electrically communicate directly with other electrical devices such as the indicator 34 and still remain sealed inside housing 12.

An elastomeric gasket surrounding the projecting portion 55 seals the opening 62. Connector 54 may include a plurality of threaded openings for receiving fasteners to facilitate sealing.

The apparatus 10 as shown in FIG. 4 is designed for assembly in the position shown and then preferably mounted in an inverted position, i.e., cover 14 mounted to the underside of the vehicle, or possibly mounted on top of an axle. Bushings 66, preferably made of steel, are placed within openings 39 for aiding in fastening the apparatus 10 to the desired location with fasteners (not shown) such as screws, bolts, rivets, or the like. Bushings 66 also add strength to the connection. Bushings 66 are also inverted when the apparatus is mounted.

Advantageously, the multi-pinned electrical connector 54 provides electrical communication with a number of electrical devices, e.g., warning lamps, solenoids, pressure switches, etc.

Figure 5:
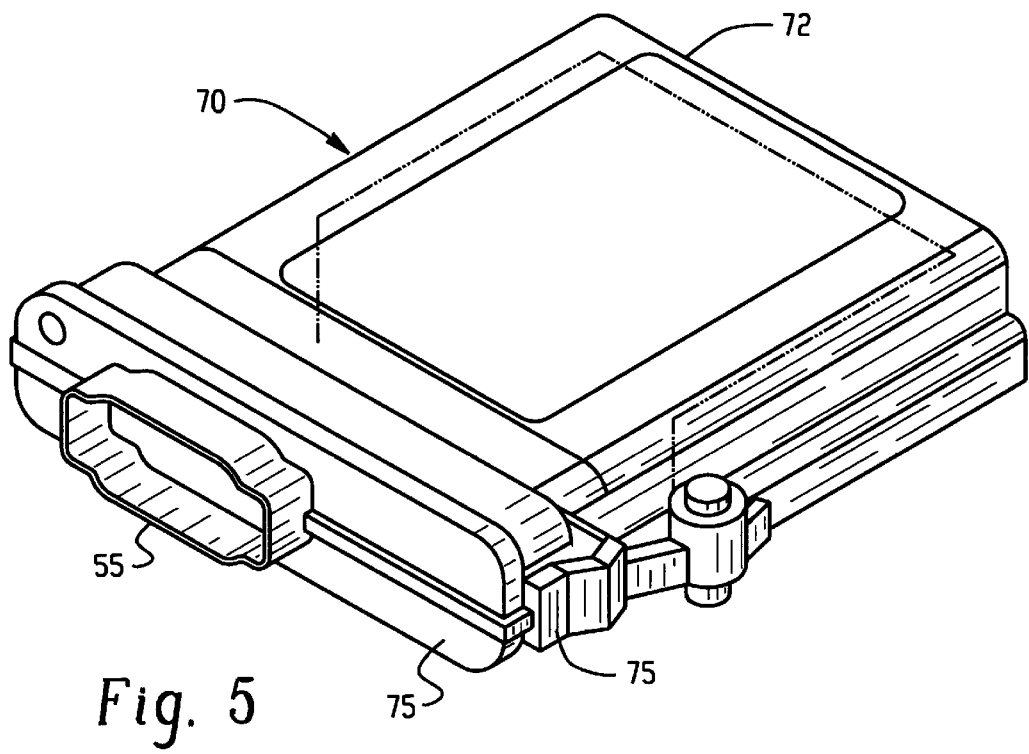
FIG. 5 is an elevated perspective view of a preferred embodiment of the present invention.
Figure 6:
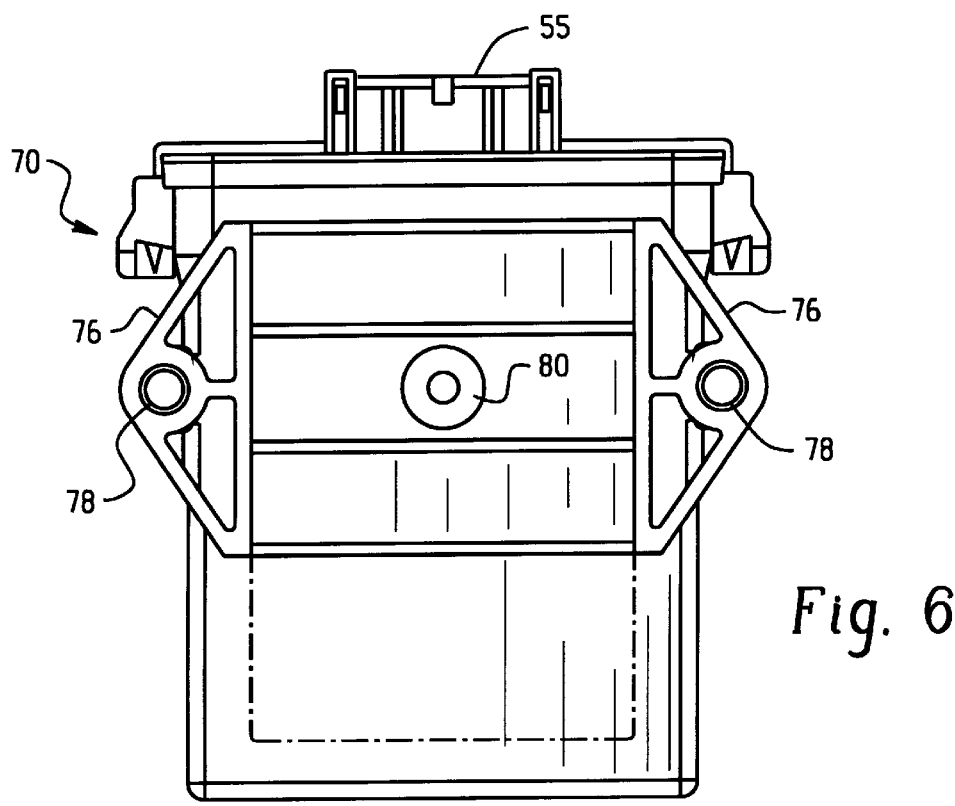
FIG. 6 is a bottom view of the preferred embodiment of the present invention.

FIG. 5 depicts a perspective view of a preferred embodiment 10 of the present invention. The tire management receiver 10 in the preferred embodiment comprises a housing 72 that slides over the printed circuit board 50 and is snap locked or fastened directly to the cover 74. A plurality of fasteners (not shown) or more preferably snap locking tabs 75 securely holds the housing 72 to cover 74. Cover 74 has the printed circuit board 50 and connector 54 held therein. Projecting portion 55 extends out from cover 74 and is sealed therein with a suitable gasket like that described with reference to FIG. 4. Housing 72 preferably includes mounting brackets 76 integrally formed therewith. Apertures 78 through brackets 76 receive fasteners for holding the apparatus 70 preferably on the carriage or underside of a vehicle.

An opening 80 preferably in the bottom of housing 74 is covered with a gas permeable membrane like GORE-TEX® material from the exterior. The opening is preferably situated on the bottom to keep most of the dirt, snow, rain, or the like from blocking the gas permeable membrane. A donut shaped piece of double sided pressure sensitive tape, or the like is used for securing the gas permeable membrane on the exterior. Opening 80 may include a circular retainer disc to accommodate the double side pressure sensitive tape for facilitating mounting thereon. An alternative embodiment may include a grooved receptacle adapted to slidably engage the membrane. Mounting brackets 76 provide sufficient elevation of the housing 74 to allow air to pass under the housing through membrane 18 into the tire management receiver as previously described with respect to the embodiment shown in FIG. 4.

It should be immediately apparent that apparatus 10 while shown as being substantially rectangular may be any desired shape and constructed of a thermoplastic material, metal, or combination of both materials. Similarly, apparatus 10, while described in particular for use with a pressure sensor may be employed with any sensor, in a variety of environments.

While specific embodiments of the invention have been shown and described in detail to illustrate the application of the principles of the invention, it will be understood that the invention may be embodied otherwise without departing from such principles. It is envisionable that the cover and housing of the present invention may be of any shape or size and constructed of a wide variety of materials.

We claim:

1. An apparatus for measuring atmospheric pressure for compensating a pressure measurement in a sealed enclosure, comprising:
    a housing, one end of said housing being open;
    a cover positioned on said housing, said cover being constructed to be received on the open end of said housing for providing a sealing fit therewith, said cover having an opening therethrough for allowing pressure equalization with an interior of said housing;
    a gasket interposed between said cover and said housing, said gasket being constructed of a material that provides a fluid-tight seal between said cover and said housing, said gasket having at least one passage of a predetermined size for allowing passage of air between said opening in said cover and said interior of said housing;
    a gas permeable membrane also interposed between said opening in said cover and said housing, said gas permeable membrane being constructed of a material that allows air to pass therethrough;
    a pressure sensor positioned within said housing for measuring atmospheric pressure based upon the air passed through said gas permeable membrane into said housing; and
    means for receiving a pressure signal from a sealed enclosure and compensating the pressure signal based upon the measured atmospheric pressure.

2. An apparatus as recited in claim 1, wherein said opening in said cover is a predetermined size for allowing air to pass therethrough and through said gas permeable membrane into said housing.

3. An apparatus as recited in claim 1, wherein said pressure signal receiving means comprises a printed circuit board with an electrical connector attached thereto.

4. An apparatus as recited in claim 2, wherein said housing includes an enlarged peripheral portion bounding the open end, said enlarged peripheral portion having walls extending from walls of said housing and being constructed to receive said cover positioned therein.

5. An apparatus as recited in claim 4, wherein said enlarged peripheral portion includes snap lock tabs constructed to engage and hold said cover.

6. An apparatus as recited in claim 5, wherein said housing further comprises an extending portion on at least two side walls, each of said extending portions having an opening therethrough.

7. An apparatus as recited in claim 6, wherein said cover further comprises at least two extending portions with an opening through each of said extending portions, said extending portions of said housing being constructed to overlap with said extending portions of said cover in a manner to substantially align the openings therewith.

8. An apparatus as recited in claim 1, further comprising means for indicating a predetermined pressure measurement differential in communication with said pressure signal receiving means for alerting an operator to said pressure measurement differential.

9. An apparatus as recited in claim 8, wherein said indicating means is a member selected from the group consisting of a visual indicator, an audio indicator, and a combination thereof.

10. An apparatus as recited in claim 9, wherein said indicating means further includes communication means for alerting a remote location, another vehicle display, or electronic controller of said pressure measurement differential.

11. A tire pressure management receiver for compensating for atmospheric pressure comprising:
    a housing having an open end, a bottom, and a wall;
    a cover constructed to be positioned within said open end of said housing, said cover and said housing together defining a sealed enclosure and having an opening for allowing, air to pass therein;
    a gas permeable membrane covering the opening in said sealed enclosure, said gas permeable membrane selectively allowing air to pass into the sealed enclosure;
    a pressure sensor situated within said sealed enclosure for measuring atmospheric pressure; and
    means for receiving a plurality of pressure signals from remote tire pressure sensors and compensating pressure signals therefrom based upon the atmospheric pressure.

12. An apparatus as recited in claim 1, further comprising an indicator in communication with and responsive to said tire pressure management receiver for alerting an operating to a predetermined pressure measurement differential in a tire.

13. An apparatus as recited in claim 12, wherein said receiving means comprises a printed circuit board with an electrical connector attached thereto within said housing, said electrical connector being electrically in communication with said pressure sensor and a plurality of electrical devices responsive thereto.

14. An apparatus as recited in claim 13, wherein a projecting portion of said electrical connector is positioned in an opening within said sealed enclosure in a substantially air tight manner.

15. An apparatus as recited in claim 14, wherein said sealed enclosure includes at least one extending portion with an opening therethrough for receiving a fastener for holding, the tire pressure management receiver to a vehicle.

16. An apparatus as recited in claim 11, further comprising a gasket interposed between said cover and said housing for providing a fairly air tight seal.

17. An apparatus as recited in claim 13, wherein said printed circuit board is received within said cover and said housing slidingly engages said cover over said printed circuit board.

18. A method for compensating a pressure measurement for atmospheric pressure comprising the steps of:
    providing a housing, the housing having an open end, a bottom, and a wall;
    providing an opening in the housing for allowing air therein when the housing is sealed;
    covering the opening with a gas permeable membrane;
    positioning a pressure sensor and circuit means for remotely receiving a pressure signal within the housing;

sealing the housing with a cover constructed to seal the open end securely;

measuring atmospheric pressure from the air in the sealed housing;

receiving a pressure signal from a remote pressure sensor; and compensating the remote pressure signal based upon the measured atmospheric pressure.

19. A method as recited in claim 18, further comprising the step of transmitting the compensated pressure measurement to an indicator.

20. A method as recited in claim 19, further comprising the step of providing an alarm when the compensated pressure measurement falls below a preset value.

* * * * *